May 22, 1962
J. K. LYON
3,035,612
SINGLE-HANDLED VALVE STRUCTURE
Filed April 21, 1958
3 Sheets-Sheet 1
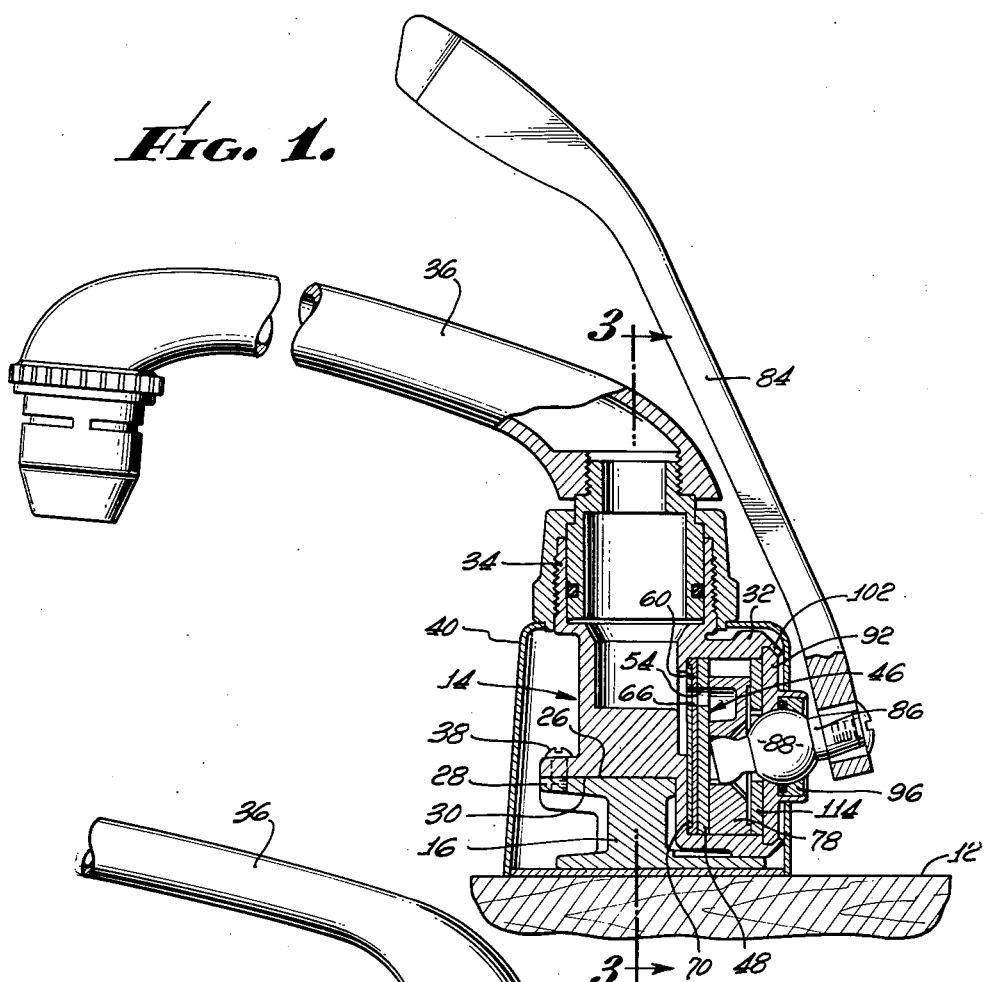
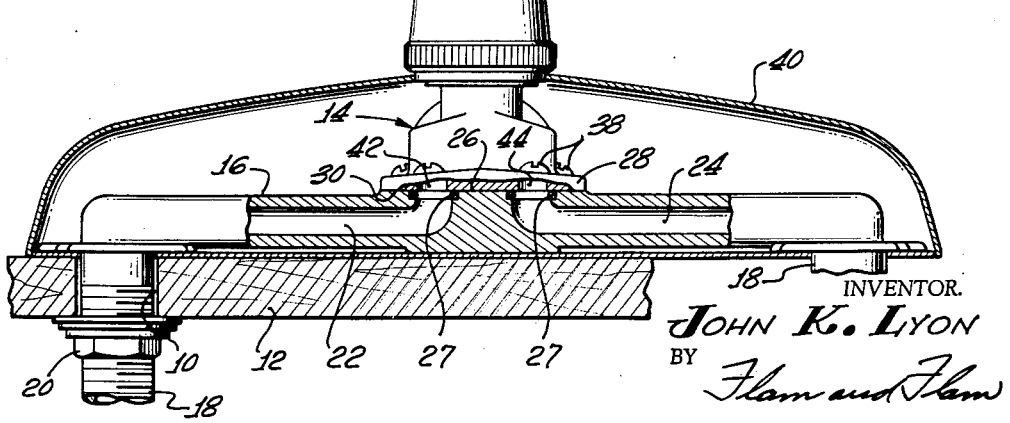
INVENTOR.
JOHN K. LYON
BY
ATTORNEYS.

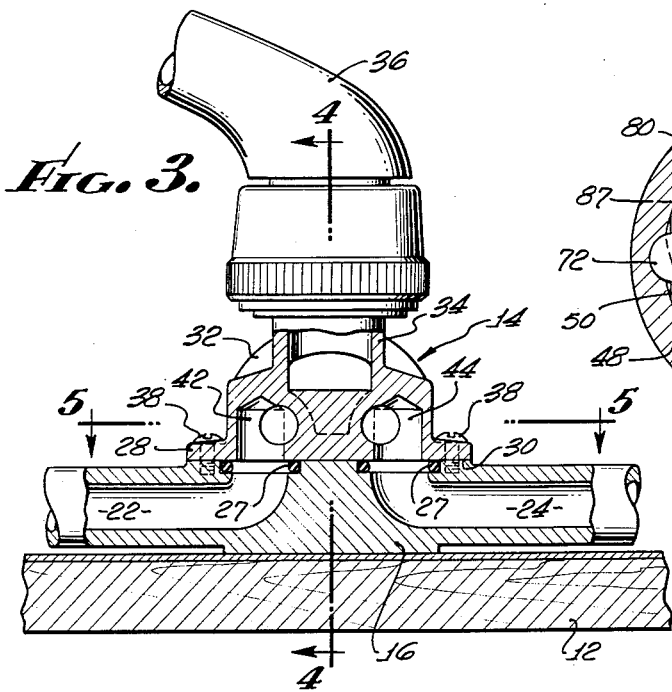
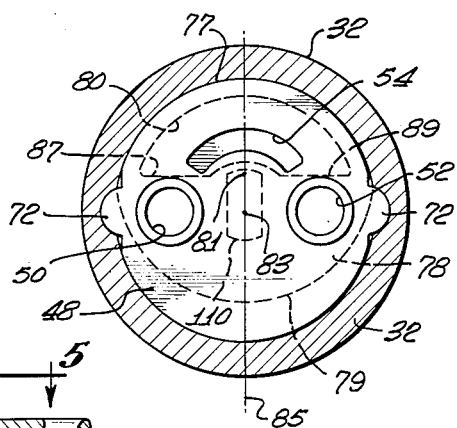
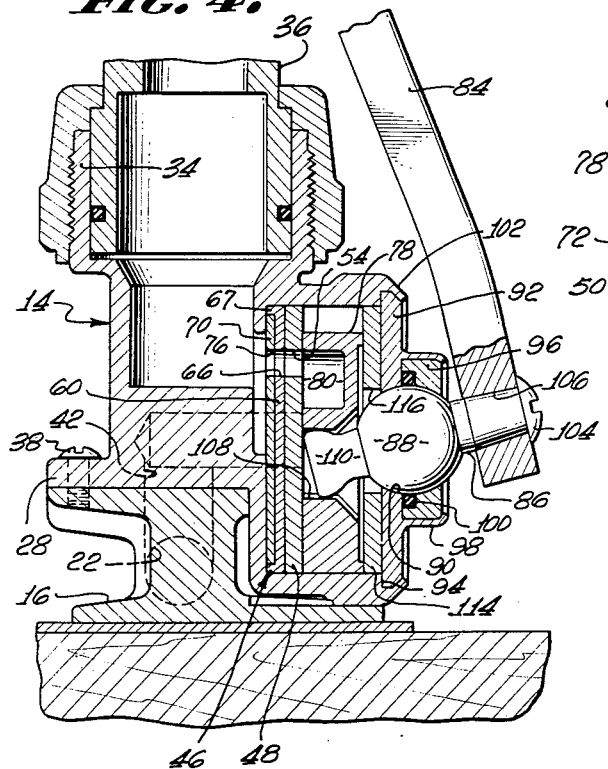
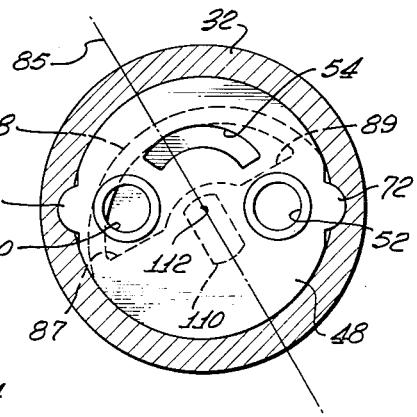
INVENTOR.
JOHN K. LYON
BY
Flam and Flam
ATTORNEYS

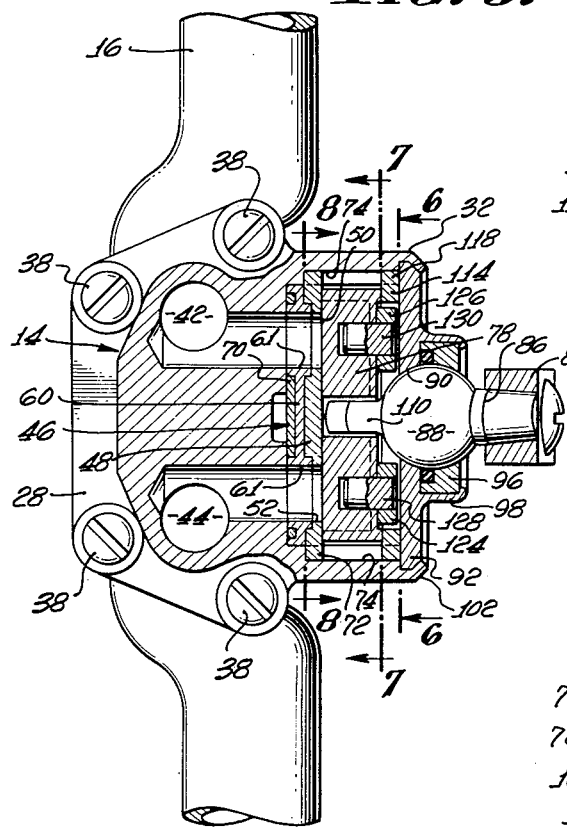
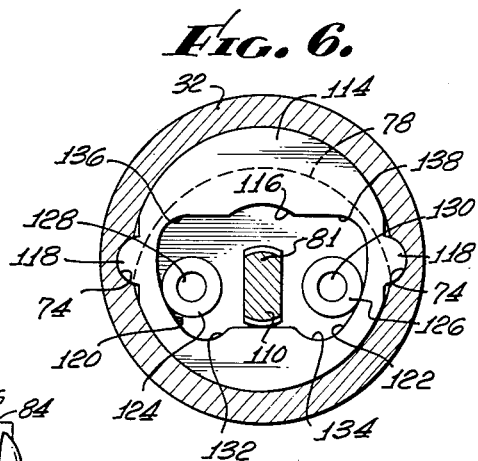
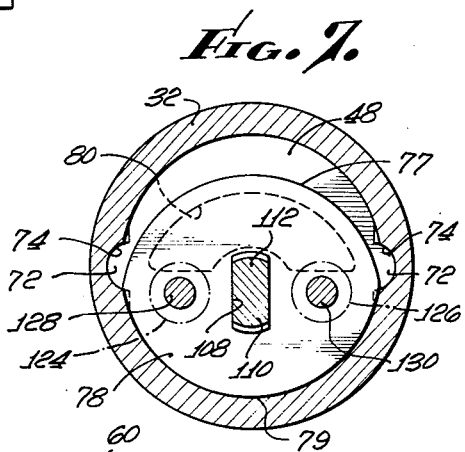
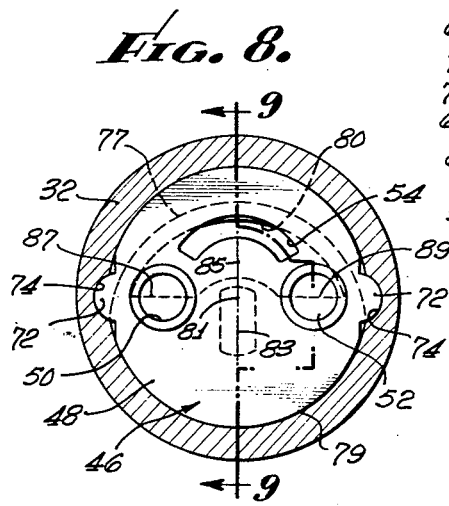
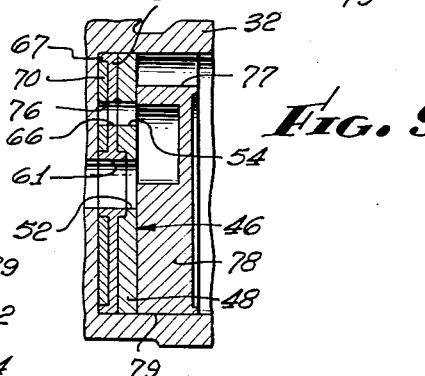

United States Patent Office 3,035,612
Patented May 22, 1962

3,035,612
SINGLE-HANDLED VALVE STRUCTURE
John K. Lyon, Pasadena, Calif., assignor to Price-Pfister Brass Mfg. Co., Los Angeles, Calif., a corporation of California
Filed Apr. 21, 1958, Ser. No. 729,939
9 Claims. (Cl. 137—625.17)

This invention relates to a single-handled volume and proportion control valve commonly called a mixing valve, especially useful for combined hot and cold water faucets or fixtures.

A single-handled valve of this general character is disclosed and claimed in my joint application with Gottlob Hinderer, Serial No. 637,914, filed February 4, 1957, now Patent Number 2,977,986, issued April 4, 1961, and entitled Single-Handled Valve.

In said prior application, there is disclosed a valve structure utilizing a valve plate movable angularly about a fixed axis and radially toward and away from said axis. A ball mounted lever has a particular connection with the valve plate so that the valve plate is confined for movement only in these two manners. It is thus ensured that for any position of the lever, the valve plate is in a predetermined position corresponding to a certain volume adjustment and a certain proportion adjustment.

In said prior application, there is disclosed and claimed a particular seal structure for preventing outward passage of fluid past the ball joint. One of the primary objects of this invention is to provide a mixing valve of the character disclosed in said prior application but which overcomes the requirement regarding a seal at the ball joint. To accomplish this purpose, a novel valve plate structure is utilized that cooperates both with the inlets and the outlet in such manner that the valve plate throughout all positions prevents peripheral passage of fluid between the seat and the valve plate.

As described in said prior application, it is necessary that certain limits of movement of the valve plate itself be imposed in order to achieve a generally triangular range of movement of the lever. By providing such triangular range of movement, there is one and only one "off" position of the valve. An object of this invention is to impose such limits without detracting from the unique relationship of the valve plate with the inlets and outlet. For this purpose, there is provided on the reverse side of the valve plate means cooperable wtih a stationary guide.

Another object of this invention is to provide a valve of this character which is simple so that it may be manufactured at a price competitive with usual double-handled fixtures.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a vertical sectional view, taken through a sink fixture incorporating the present invention, a portion of the apparatus being illustrated in elevation;

FIG. 2 is a frontal elevation of the fixture proper, the decorative cover being shown in section and also a portion of the body structure itself;

FIG. 3 is a fragmentary sectional view, taken along a plane indicated by line 3—3 of FIG. 1;

FIG. 4 is an enlarged fragmentary sectional view, showing a portion of the apparatus illustrated in FIG. 1 and taken along a plane indicated by line 4—4 of FIG. 3;

FIG. 5 is an enlarged sectional view, taken along a plane indicated by line 5—5 of FIG. 3;

FIGS. 6, 7 and 8 are sectional views illustrating the valve plate structure, and taken along planes corresponding to lines 6—6, 7—7 and 8—8 of FIG. 5;

FIG. 9 is a sectional view, taken along an offset plane indicated by line 9—9 of FIG. 8; and FIGS. 10 and 11 are views similar to FIG. 8, but illustrating the valve plate in other positions.

The faucet shown in FIGS. 1 and 2 is mounted at appropriately spaced holes 10 (FIG. 2) in decking 12 surrounding a sink or lavoratory. There are two main parts to the structure: a body 14 and a fitting 16 supporting the body. Both parts may be made of cast brass or other suitable material. The fitting 16 provides a pair of spaced depending threaded pipe-like extensions 18 projecting through the apertures 10. Nuts 20 clamp the fitting 16 in place. Appropriate hot and cold water supply conduits may be connected to the extensions 18 beneath the decking 12.

The fitting 16 provides two passages 22 and 24 leading from the respective extensions 18 to an elongate land 26 located centrally of the fitting at its uppermost portion. The ends of the passages 22 and 24 open upwardly at spaced portions of the land and are enlarged to accommodate O-rings 27.

The valve body 14 has an integral mounting flange 28, providing on its lower side a flat surface 30 engaging the land 26.

As shown in FIG. 1, the lower surface 30 at the flange 28 extends laterally from the bottom of a cup 32 located at the rear of the faucet structure. In this cup, the operative parts of the valve structure, to be described presently, are accommodated.

The body 14 has an upward, exteriorly threaded extension 34 forming an outlet. A swing spout 36 is, in a conventional manner, mounted upon the extension 34. A series of cap screws 38 mount the flange 28 of the body 14 to the supporting fitting 16.

An appropriate decorative housing 40 encloses the fitting 16 and all of the body 14 except its upper extension 34 at which the swing spout 36 is mounted and the end of the cup from which an operating arm projects.

Right-angle passages 42 and 44 (see also FIGS. 3 and 5) conduct fluid from the fitting passages 22 and 24 to the bottom of the recess formed by the cup 32. Each right-angle passage 42 and 44 includes a vertical portion registering with the end of the corresponding body passages 22 and 24 (see also FIG. 3). The O-rings 27 establish appropriate seals. The body passages 42 and 44 have horizontal portions opening into the bottom of the recess formed by the cup 32 at places located symmetrically with respect to a vertical diametric plane of the cup 32.

A composite seat structure 46 (FIG. 5) fits within the bottom of the recess formed by the cup 32. The composite seat structure 46 comprises, first, a facing 48 or seat member proper provided with two apertures or openings 50 and 52 forming the actual inlets into the recess of the cup 32. The facing 48 also has a through arcuate aperture or opening 54 (see FIGS. 4 and 8), lying above the inlets 50 and 52, that forms an outlet.

The second part of the seat structure is a gasket 60 that provides seals for the inlets to confine flow to the apertures of facing 48 and a seal for confining flow to the outlet and preventing flow about the periphery of the facing 48. The gasket 60 has openings 61 (FIG. 5) registering with the facing inlets, and an arcuate opening 66 (FIG. 4) that registers with the arcuate outlet 54 of the facing 48. The gasket 60 accommodates within its peripheral flange 67 a backing plate 70 that is correspondingly apertured. The backing plate 70, the gasket 60 and the facing 48 are held against the bottom of the cup recess, there being ears, as at 72 (FIGS. 6, 7, 10, 11), on the facing plate 48 registering with grooves 74 in the flange of the cup 32 to ensure alignment of the openings of the seat structure with the passages 42 and 44.

The gasket 60 also has raised portions 62 and 64 fitting enlarged portions of the openings in the backing plate 70. As the composite seat structure 46 is held against the bottom of the cup recess, those portions of the gasket 60 adjacent the inlets 50 and 52 ensure an appropriate seal to prevent cross flow between the passages 42 and 44. The flange 67 of the gasket by engagement with the bottom of the cup recess and the facing 48 seals the seat peripherally, and prevents flow about the seat member or facing 48. It may now be appreciated that the gasket 60 comprises, in essence, three O-rings, two at the inlets and one at the periphery, all held together and formed integrally with a web. Accordingly assembly is facilitated and the number of parts is minimized.

As shown clearly in FIG. 4, the arcuate recesses 54 and 66 and a corresponding arcuate recess 76 in the backing plate all register with the bottom of the upward extension 34 of the body 14 for flow to the spout 36.

For controlling the inlets 50 and 52, a valve plate 78 is provided. The valve plate 78 has, on the side facing the seat 46, a generally arcuate cavity or recess 80 (FIGS. 4 and 10) continuously registrable with the outlet 54 and registrable, to a selected degree, with one or both inlets 50 and 52.

The valve plate 78 has a peripheral configuration defined by intersecting cylindrical surfaces 77 and 79 (FIGS. 8 and 10). The radius of curvature of each of the cylindrical surfaces corresponds to the radius of the cup recess. The centers or central axes 81 and 83 of curvature of the two cylindrical surfaces 79 and 77 are spaced slightly from each other so that a generally oval contour for the valve plate 78 is provided, and a plane 85 including the centers 81 and 83 is the plane of symmetry of the control recess 80. The valve plate 78 is movable linearly a distance corresponding to the spacing of these centers 81 and 83 of the cylindrical surfaces of the valve plate 78.

In FIG. 10, the valve plate 78 is positioned upwardly so that its recess 80 has its ends 87 and 89 lying entirely symmetrically above the inlets 50 and 52. The valve plate 78, accordingly, entirely seals both inlets 50 and 52. To open the valve, the valve plate 78 is moved down so that the ends 87 and 89 of the recess 80 register with segments of the inlets 50 and 52. This relationship is illustrated clearly in FIG. 8. At the lowermost position of the valve plate 78, the ends 87 and 89 of the recess 80 bisect the inlets 50 and 52, the recess ends 87 and 89 falling in a plane passing through the center 81, which is now coincident with the center 112 of the cup recess. Accordingly, the inlets 50 and 52 are opened equally and fluid from the inlets 50 and 52 passes via the recess 80 to the outlet 54. Since the recess 80 is considerably larger and wider than the outlet 54, it registers with the outlet 54 throughout this range of movement of the valve plate.

When the valve plate 78 is in its lower mid-position, it can be rotated about the axis 112 of the cup recess in order to close one of the inlets while opening the other inlet. Thus, as illustrated in FIG. 11, the valve plate has rotated in a counterclockwise position, and the inlet 50 is now substantially completely open, the end 87 of the arcuate recess 80 clearing the lower portion of the inlet 50. At the same time, the other end 89 of the arcuate recess 80 is above the inlet 52. Accordingly, this inlet is now sealed.

This orientation of the valve plate 78 may correspond, for example, to full opening of the hot water inlet.

The valve plate 78 is positioned by a lever 84 that extends upwardly above the mounting of the swing spout 36 and the extension 34 (FIG. 1). The lever 84 is joined to an arm 86 that is supported for universal type movement at the outer end of the cup 32. For this purpose, there is formed a ball 88 centrally of the arm 86. The ball 88 engages an outwardly facing ported spherical seat 90 formed on a closure plate 92. The closure plate 92 is held against a shoulder 94 formed at the outer end of the cup 32. The closure 92 mounts a companion seat element 96 which is accommodated within a flange 98 extending outwardly of the closure 92. The center of the ball 88 is included in the axis 112 of the cup recess.

Between the seat forming elements an O-ring 100 is accommodated to establish a dust seal. No water reaches the O-ring 100 by virtue of the fact that the valve plate 78 has its marginal portions always in engagement with an area of the facing element 48 that extends in encompassing relationship to the inlets 50 and 52 and the outlet 54. The recess 80 of the valve plate opens only in a direction toward the outlet 54 and the inlets 50 and 52.

The arm 86, the seat forming members 96 and 92 therefor, and the O-ring 100 are assembled together as a unit before placement at the cup 32. When they are placed in engagement, the terminal portion of the cup is spun over, as at 102, to lock the closure 92 in position.

Opposite ends of the arm 86 project inwardly and outwardly of the closure 92. The outer portion of the arm 86 is attached to the lever by the aid of a screw 104 which engages a capped hole in the tapered end of arm 86 that passes into an aperture 106 in the end of the lever 84. The aperture 106 and the end of the arm 86 are appropriately non-circular to ensure against relative movement between the lever 84 and the arm 86 about the arm 86 as an axis.

The inner end of the arm 86 projects into a slot or socket 108 formed centrally of the valve plate 78 and symmetrically with respect to the plane 85 thereof. The arm 86 has an extension 110 that fits within the socket 108.

The socket 108 of the valve plate 78 is never in registry with either the inlets 50 and 52 or the outlet 54. Accordingly, the flat area of the facing element 48 of the composite seat structure 46 ensures against passage of fluid via the socket 108 to the outer areas of the cup 32.

In the present instance, the socket 108 and extension 110 have straight sides extending in planes parallel to the symmetry plane 85 whereby the valve plate is confined for movement in a planar coordinate system. By this it is meant that two coordinates determine the complete position and orientation of the valve, the coordinates conveniently corresponding to the two variables to be controlled, namely, volume and proportion.

Except for manufacturing tolerances, the valve plate is thus confined so that the plane 85, fixed with respect to the valve plate 78, always passes through the center of the ball 88 and thus through the axis 112. The valve plate 78, however, yet has two modes of movement without detracting from the foregoing criterion. Thus, the plate 78 can shift radially toward and away from the axis 112, and it can also move angularly about the axis 112. In the former case, the straight sides of the socket 108 and extension 110 slide with respect to each other. To provide the former mode of movement, the ends of the socket 108 and the ends of the projection 110 are rounded. Hence, as the projection 110 is tilted upwardly, as by lever 84 for example, from the position illustrated in FIG. 4, the rounded ends of the socket 108 and of the projection 110 permit relative angular movement between the arm 86 and the valve plate 78. During this course of movement, the valve plate 78 shifts radially relative to the axis 112. To provide the latter mode of movement, the arm 86 is rotated about the axis 112.

The specific nature of the socket 108 and the projection 110 determines only two modes of movement of the valve plate 78 corresponding to two elements in a circular coordinate system. Angular movement of the valve plate 78 about the axis 112 will move the ends 87 and 89 of its slot 80 so that more registry is achieved with one of the inlets and less registry is achieved with the other of the inlets. Hence, angular movement of the valve plate serves to determine the extent of relative opening of the inlets 50 and 52. Radial movement of the valve plate 78, on the other hand, shifts the ends of the slot 80 in corresponding directions relative to the inlets 50 and 52. Thus, for example, as the valve plate 78 is moved downwardly from the position illustrated in FIG. 10, both ends of the slot 80 move correspondingly relative to the corresponding inlets 50 and 52 to open them. Hence, radial movement of the valve plate 78 determines the total combined opening of the inlets corresponding to the rate of flow of fluid through the entire valve.

Desirably there are triangular limits imposed upon movement of the lever arm 84 so that there is one and only one "off" position of the handle or lever 84. In this manner, a ready reference point at one corner is provided so that manipulation of the lever 84 becomes automatic. The other two corners of the triangular boundaries of movement of the lever correspond to full "on" position of one of the inlets while the other inlet is closed, and vice versa.

To provide this triangular mode of movement within the framework of a circular coordinate system, a cam plate 114 is provided (FIG. 6). This cam plate 114 is accommodated between the closure 92 and the outer end of the valve plate 78. It has a central aperture 116 (FIG. 4) to permit passage of the arm 86. It is held in a definite angular orientation relative to the cup 32 by the aid of tabs 118 (FIG. 6) likewise accommodated in the cup groove 74. The opening 116 in the cam is peripherally bounded by two symmetrically disposed arcuate sections 120 and 122, the centers of curvature of which fall at the axis 112 of the cup.

Two rollers 124 and 126, mounted upon stub shafts 128 and 130 projecting rearwardly from the valve plate 78, both engage these arcuate surfaces 120 and 122 when the valve plate 78 is in full "on" position, as in FIG. 6. As the valve plate 78 rotates about the axis 112, the rollers 124 and 126 bear against the arcuate surfaces 120 and 122, their centers rotating about the axis 112.

The lower ends of the arcuate recesses 120 and 122 curve upwardly, as at 132 and 134. These form limits for the respective rollers 124 and 126 upon opposite angular movement of the valve plate from the neutral position illustrated in FIG. 6 and as illustrated in FIG. 11.

The other ends of the arcuate recesses 120 and 122 have inwardly curved portions, as at 136 and 138, both of which engage the rollers 124 and 122 when the valve plate is shifted upwardly. The arcuately returned portions 136 and 138 serve to center the valve plate as it is moved upwardly. Thus, if the valve plate is in a relatively clockwise position from that illustrated in FIG. 6, the roller 124 normally will first engage its arcuate seat, as at 136, as by direct rearward movement of the lever 84. Further force on the lever 84 creates a reaction at roller 124, tending to rotate the valve plate and the lever 84 until the neutral orientation is achieved, which is determined by equal engagement of both rollers with their seats 136 and 138. A single "off" position is, accordingly, provided.

When the valve plate 78 is uppermost (opposite to that illustrated in FIG. 6), both rollers 124 and 126 engage the upper ends 136 and 138 of the recess. This means that rotation of the valve plate cannot be achieved from that position without translating the valve plate toward open position. It is for this reason that a single "off" position at a corner of a triangle is achieved. As the valve plate translates from the "off" position, one or both rollers (depending upon the mode of such movement) move from the corresponding end surfaces 136 and 138. The amount of movement possible through rotation increases as the spacing increases, and the triangular boundary is provided.

The cam and roller structures are located on the outer side of the valve plate where water is permitted to enter. The problems for sealing, as by complications of the cam, are thus avoided.

The inventor claims:

1. In a mixing valve: a body having means forming a substantially cylindrical recess and a seat at the bottom of the recess; means forming a pair of inlets opening into the seat and located symmetrically with respect to an axial plane of the recess; means forming an outlet opening with said seat; a valve plate movable along the seat and having arcuate cavity means, the ends of which are positioned for selective registry with the inlets, the cavity means opening only on that side of the valve plate facing the seat; there being a symmetry plane fixed with respect to the valve plate on opposite sides of which said cavity means extends; means for moving the valve plate and confining said symmetry plane so that it always passes through the axis of said recess, whereby a circular coordinate system of movement of the valve plate is provided; a guide on that side of the valve plate remote from said seat, and having arcuate surfaces disposed symmetrically with respect to said axial plane; a pair of bearing members carried symmetrically by the valve plate and engageable with the respective arcuate surfaces; the ends of the arcuate surfaces determining substantially triangular limits of movement of said valve plate; the valve plate having a surface establishing a seal peripherally about the inlets, outlet and cavity throughout the range of movement of the valve plate, the cavity continuously registering with said outlet.

2. In a mixing valve: a body having means forming a substantially cylindrical recess and a seat at the bottom of the recess; means forming a pair of diametrically disposed inlets opening into the seat, the orientation of said inlets determining an axial plane between the seats with respect to which the inlets are symmetrically disposed; means forming an outlet from the seat and located in quadrature relationship to both inlets; a valve plate having an arcuate cavity, the ends of which are simultaneously registrable with both inlets; means for moving the valve plate and confining a plane fixed with respect thereto to pass through the axis of the recess, said fixed plane bisecting said cavity; a ported guide plate mounted at the recess on that side of the valve plate remote from said seat, and having a pair of arcuate surfaces symmetrically disposed about said axial plane of said recess, and centered at the axis of said recess; and a pair of follower elements symmetrically disposed with respect to said fixed plane and both engageable with the arcuate surfaces when said fixed plane is translated in one radial direction relative to said cup axis; said arcuate surfaces having spaced first ends cooperable with said follower elements to determine opposite limits of angular movement of said fixed plane of said valve plate, said arcuate surfaces having second ends engageable with the follower means for centering the fixed plane upon translation thereof in the other radial direction relative to said cup axis; the ends of the valve plate cavity being so disposed that they register with corresponding halves of said inlets when said valve plate is in a neutral angular position and said plane is translated in said one direction to the limit allowed by said follower elements, angular movement of said valve plate causing increasing registry of said cavity with one inlet and decreasing registry with the other inlet; the inlets being respectively out of registry with said cavity at the respective limits of angular movement of the valve plate as determined by the spacing of said first ends of said arcuate surfaces.

3. In an adjustable mixer valve: a movable valve plate; a ported seat member on which the valve plate is in contact; the ports corresponding to two inlets and an outlet, the movable valve plate having passage means registrable with the inlets to an extent dependent upon the position of the valve plate, said passage means being in communication with the outlet; an arm engaging the valve plate for moving the valve plate; a cam plate overlying the valve plate and bearing against the valve plate to confine it against the seat member, said cam plate having an aperture through which a connection between the arm and the valve plate is established; cam follower means carried by the valve plate and located within the aperture; said cam plate aperture having edges co-operating with said cam follower means to define limiting boundaries for the movement of the valve plate; and a support element for mounting the arm independently of said cam plate, said support element bearing against the cam plate to confine it against said valve plate.

4. The combination as set forth in claim 3 in which said mixer valve includes a body element having a surface in which two inlets and an outlet are provided for cooperation with said ports of said seat member; said elements together defining a space in which the seat member and the cam plate are fitted; said elements having mutually engageable means for holding them together and to determine the bearing forces between the support element, the cam plate, the valve plate, and said seat member.

5. The combination as set forth in claim 4 in which said mutually engaging means comprises a spun over portion on one of the elements engaging the other element.

6. The combination as set forth in claim 4 in which the seat member and the cam plate have peripheral lugs, and in which said space is provided with keyways or slots for fitting the lugs, and whereby the seat member and the cam plate are held against moving angularly in the space.

7. The combination as set forth in claim 4 together with a unitary seal member interposed between said surface and said seat member, said seal member having a pair of annular seals for the inlets and a third annular seal surrounding both inlets and the outlet and engaging adjacent the periphery of said seat member as well as at said body element surface, said seal member having a web integrally joining the three seals for unit assembly; said valve plate having a cavity opening only against said seat member and by the aid of which said inlets are connected to the outlet, the seat member sealing the cavity.

8. In an adjustable mixer valve having: a movable valve plate; a ported plate on which the valve plate is in contact; the ports in the ported plate corresponding to two inlets and an outlet, the movable valve being capable of connecting either or both of the inlets to the outlet, and to an extent depending upon the position of the valve plate; the combination therewith of an arm engaging a slot formed in the valve plate and having universal movement to move the plate in any direction; a cam plate overlying the valve plate and having a cam aperture defining a limiting boundary to the movement of the valve plate; and cam rollers carried by the valve plate and adapted to contact the periphery of the cam aperture.

9. In a valve structure having a seat member provided with a pair of inlets and an outlet, a valve member movable along the seat, and having an opening, parts of the opening being registrable with said inlets, and parts of the opening being registrable with the outlet, means confining the valve member for movement in a circular coordinate system about an axis normal to and fixed with respect to the seat member and located between the inlets, there being a reference plane fixed with respect to said valve member in which said axis is always included, the combination therewith of: a pair of cam follower means projecting from the valve members on that side thereof opposite the seat; an apertured cam member held against movement with respect to said seat member, and having two surface parts at its aperture cooperable with the respective cam follower means, each surface part having a substantial portion extending arcuately about said axis as a center, and respectively located for simultaneous engagement with the corresponding cam means; said arcuately extending portions, when both in engagement with the follower means determining a limited radially shifted position of said reference plane; the surface parts having corresponding first end portions determining limits to the angular movement of said valve member; the first end portion of one surface part being engaged by cam follower means for determining maximum registry of said valve member opening with one of said inlets and minimum registry with the other of said inlets; the first end portion of the other surface part being engaged by the other cam follower means for determining maximum registry of said valve member opening with said other of said inlets and minimum registry with said one of said inlets; the surface parts having second end portions that, when both are in engagement with said follower means determine the opposite limited radially shifted position of said reference plane, said second end portions causing centering movement of the valve member as the valve member is shifted radially toward said opposite limited position.

References Cited in the file of this patent

UNITED STATES PATENTS

| | | |
|---|---|---|
| 2,503,881 | Manis | Apr. 11, 1950 |
| 2,601,966 | Busick | July 1, 1952 |
| 2,832,561 | Holl | Apr. 29, 1958 |
| 2,878,829 | Folmsbee | Mar. 24, 1959 |